United States Patent [19]
Fornataro

[11] 3,798,951
[45] Mar. 26, 1974

[54] TORQUE DISTRIBUTION SYSTEM

[75] Inventor: Augustine A. Fornataro, Ellwood, Pa.

[73] Assignee: Herr-Voss Corporation, Callery, Pa.

[22] Filed: Oct. 3, 1972

[21] Appl. No.: 294,503

[52] U.S. Cl............................. 72/205, 72/249
[51] Int. Cl............................. B21b 39/08
[58] Field of Search......... 72/205, 443, 249; 74/675

[56] References Cited
UNITED STATES PATENTS

| | | | |
|---|---|---|---|
| 3,626,737 | 12/1971 | Defontenay | 72/205 |
| 3,427,848 | 2/1969 | Gay | 72/205 |
| 3,641,797 | 2/1972 | Bell et al. | 72/205 |

Primary Examiner—Milton S. Mehr
Attorney, Agent, or Firm—Buell, Blenko & Ziesenheim

[57] ABSTRACT

A torque distribution system for a strip bridle system with rolls and shafts having a prime mover coupled to one of the roll shafts driving a first roll. The system has a differential with three inputs. A first input is coupled to a second roll shaft with a roll which rotates at essentially the same peripheral speed as the first roll; a second input is coupled to the main prime mover; and a third input is coupled to a second prime mover of less horsepower than the main prime mover.

5 Claims, 2 Drawing Figures

TORQUE DISTRIBUTION SYSTEM

This invention relates to a torque distribution system for strip bridle systems having a plurality of rolls with shafts.

PROBLEM PRESENTED TO THE INVENTOR

In continuous strip processing lines it is necessary to change the tension in the strip at various locations throughout the given line. One common method of changing the tension is by engaging the strip with an assembly of one or more rolls, such as a bridle, and apply torque to the roll shafts. By means of the friction between the roll surface and the strip, the strip tension is changed. If the roll shaft torque is in the same direction as the roll rotation, the strip tension leaving the roll is decreased. If the torque is in a direction opposite to the roll rotation, then the strip tension leaving the roll is increased.

In a multi-roll bridle, friction and geometrical considerations dictate the torque distribution, is, friction is,- friction and angles of contact between the strip and each roll establish the ratios of each roll shaft torque to the total of all shaft torques. This distribution of torques need not be mathematically precise, but nevertheless must be confined to approximate ranges or the bridle will fail to operate properly and uncontrolled slipping will result.

PRIOR ART

A common method of providing torque distribution is to drive each roll of a multi-roll bridle with its own D.C. drive. Then if the roll surface strip interface has an adequate coefficient of friction and an adequate angle of wrap for each roll to double an incoming strip tension value, the roll bridle factor will be 2, and the D.C. drives are selected accordingly. For example, if the incoming strip tension is 1,000 pounds, then the first roll will raise the tension to 2,000 pounds, the second roll will raise the tension to 4,000 pounds, the third roll will raise the tension to 8,000 pounds, etc. Then the torque on the first roll is proportional to the strip tension change across it, that is, 1,000 pounds. The second roll torque will be proportional to 2,000 pounds, the third, to 4,000 pounds, etc. The D.C. drives are then selected in the proportion 1:2:4:8:16. Other combinations of friction and angles of wrap will dictate other distributions of torque, but the same basic considerations apply.

In tension leveling applications, either with or without a multi-roll leveler incorporated into the system, two bridle units are used: (i) a drag bridle which increases the nominal line strip tension to the values needed for leveling; and (ii) a drive bridle which decreases the leveling tensions down to nominal line tensions. Ordinarily leveling tensions are very high and consequently the cost of individual D.C. drives on each roll of the drag and drive bridles becomes high. To reduce the D.C. horsepower cost, it has been a practice to connect some or all of the drag bridle rolls to a pinion stand which is a set of connected gears and, in turn, couple the pinion stand by gearing to a differential gear box. The differential gear box provides a means by which the differential speed between the drag and drive bridles is controlled. The differential gear box is driven by electrical or mechanical means to maintain the speed differential between the drag and drive bridles.

A prime mover, usually a D.C. motor, connected to the drive bridle gearing provides for system losses, and its speed determines the speed of the drive bridle system.

There is some slipping between the strip and the roll surface in any bridle because strip tension changes are always accompanied by strip elongation or strain changes. The amount of slip in a completely geared together bridle is substantially higher than in a bridle with individually D.C. driven rolls. There is no way to control torque distribution in gear-connected bridles, and this is the reason for greater slippage.

It has also been the practice to use multi-roll, geared-together bridles capable of varying roll diameter in an attempt to produce load sharing. Rolls were designed that either increase or decrease in diameter as strip tension is intended to be either increased or decreased. While it is possible to achieve load sharing in this manner, this solution can apply to only one strip thickness, one strip tension, and one material, which is, of course, no solution at all, since strip thickness, tension, and material all may vary.

Present multi-roll bridle systems with desirable load-sharing capability carry the cost penalty associated with individual electrical drives for each roll shaft. If this cost penalty is avoided by the use of geared-together drives then new problems are encountered. Among these are: (i) greater slippage between the strip and the bridle roll surface; (ii) uncontrolled torque distribution in the bridle rolls which lead to an overload condition on one or more rolls while others are either unloaded or lightly loaded; (iii) the requirement for great precision in the manufacture of rolls to maintain close roll diameter tolerances; and (iv) increased maintenance expense to preserve the required precise diameter relationships among the rolls.

The invention preserves most of the economy of the completely geared, differentially connected, drag and drive bridles and yet achieves the desirable torque distribution (load sharing) and low slip characteristics associated with a bridle system having individual D.C. drives at each roll.

THE INVENTION PRESENTS A NEW SYSTEM TO ACHIEVE LOAD SHARING WITHIN A GEARED-TOGETHER BRIDLE

This invention presents a torque distribution system in which all of the rolls of a drag bridle are connected to all the rolls of a drive bridle by means of a main differential, with a main prime mover usually connected to the drive bridle system. The torque distributions, in this system, among the drag bridle rolls and among the drive bridle rolls may be established and maintained at suitable values.

DEFINITIONS

1. Bridle: A term denoting a system of driven rolls, around which strip is wrapped. It is the means in which strip tension is increased or decreased by friction between the strip and the surfaces of the rolls. 2. Input: A general term denoting torque, power, or rotation, usually applied at a shaft. It may be either positive or negative. A negative input may be called an output. 3. Prime Mover: A general term denoting a source of energy, positive or negative. An electric motor or diesel engine are positive prime movers; a mechanical brake is a negative prime mover. 4. Speed Control Device: A term denoting any device for controlling speed including a prime mover, a system of gears driven by a prime mover. 5. Differential: A term denoting a mechanism comprising a system of gears with three inputs. Two types of differentials are discussed in this invention, the compound epicyclic differential and the bevel gear differential. The compound epicyclic differential has two independent sun gear inputs with each sun gear driving a system of planet gears mounted on shafts which are supported by a carrier (the third input). The bevel gear differential is a system of bevel gears with one input bevel gear being connected by connecting bevel gears to an output bevel gear. The connecting level gears are supported by a carrier (the third input). 6. Strip: A general term relating to a linearly extended continuum including wire, bar, tubing and metal strip.

I provide a torque distribution system for a strip bridle system having a plurality of rolls with shafts which comprises: a main prime mover means coupled to a first roll shaft with a first roll; a differential means having three inputs, a first input coupled to a second roll shaft with a second roll which rotates at essentially the same peripheral speed as the first roll, a second input coupled to the main prime mover; and a second prime mover means of less horsepower than the main prime mover means coupled to the third input of the differential means.

I further provide a torque distribution system for a strip bridle system having a plurality of rolls with shafts which comprises: a main prime mover means coupled to a first roll shaft with a first roll; a plurality of first differential means each having three inputs, a first input of each first differential means coupled to a corresponding roll shaft in a first group of roll shafts with rolls which rotate at essentially the same peripheral speed as the first roll, a second input of each first differential means coupled to the main prime mover; a plurality of second prime mover means each of less horsepower than the main prime mover means and each coupled to a corresponding first differential means at the third input of the first differential means; a coupling differential means having three inputs, a first input coupled to the main prime mover; a second roll which rotates at a different peripheral speed from the first roll coupled to the second input of the coupling differential; a plurality of second differential means each having three inputs, a first input of each second differential means coupled to a corresponding roll shaft with a roll in a second group of roll shafts with rolls which rotate at essentially the same peripheral speed as the second roll, the second input of each second differential means coupled to the second input of the coupling differential means; a speed control means coupled to the third input to the coupling differential means; and a plurality of third prime mover means each of less horsepower than the main prime mover means and coupled to a corresponding second differential means at the third input of the second differential means.

DESCRIPTION OF THE FIGURES AND EMBODIMENT

Other details, objects and advantages of this invention will become apparent as the following description of the present preferred embodiment proceeds.

In the accompanying drawing, I have shown a present preferred embodiment of the invention in which.

Figure 1:
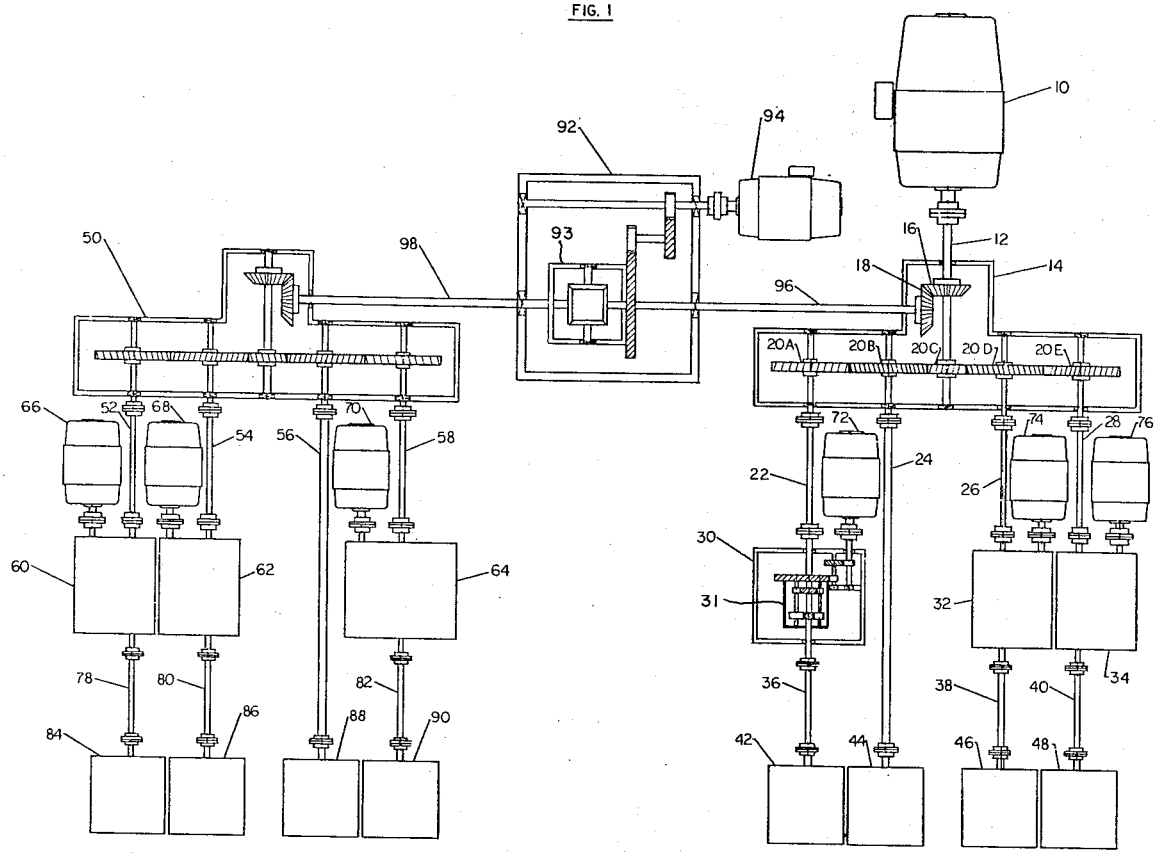
FIG. 1 is a plan view of the system.
Figure 2:
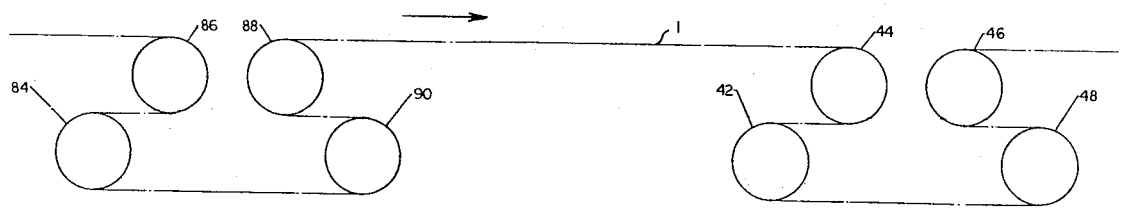
FIG. 2 is an end view of the rolls with the strip shown in schematic of the system shown in FIG. 1.

Roll 88 of the drag bridle (comprising rolls 84, 86, 88 and 90) is connected to one roll 44 of the drive bridle (comprising rolls 42, 44, 46 and 48) through a coupling differential 92. Differential 92 is driven by a speed control device 94 and thus controls the speed difference between rolls 88 and 44. The speed of roll 44 and shaft 96 is set by the speed of the main prime mover 10. The remaining rolls of the drag bridle 84, 86 and 90 are connected to the coupling differential 92 by differentials 60, 62 and 64 respectively, each driven by a corresponding prime mover 66, 68 and 70, respectively, each of less horsepower than the main prime mover 10. The remaining rolls of the drive bridle 42, 46 and 48 are each connected to the coupling differential 92 and main prime mover 10 by differentials 30, 32 and 34, each driven by a corresponding prime mover 72, 74 and 76, respectively. By torque regulation of all prime movers 66, 68, 70, 72, 74 and 76 which drive all differentials 60, 62, 64, 30, 32 and 34 the respective outputs of which are connected to the bridle rolls 84, 86, 90, 42, 46 and 48 of both the drag and drive bridles, the torque at each of these bridle rolls is precisely established and load sharing, or controlled torque distribution, is thereby achieved. Prime movers 66, 68, 70, 72, 74 and 76 may be of arbitrary power capacity but to realize the maximum benefits of this invention they are selected with smaller power capacity than the main prime mover 10. The nominal power capacity of the prime movers 66, 68, 70, 72, 74 and 76 are best established as a suitable fraction of the power required at the respective bridle roll. Thus, the system described can produce the desirable load sharing characteristics of a system with individual D.C. drives at each roll shaft at a fraction of the cost.

How this result is achieved can be shown by restating the essence of a differential. While there are many types of differentials the basic idea behind them is that there are three input rotations and three input torques. Of the three rotations two of them must be controlled, and of the three torques only one can be controlled. The reasons for this are: The three rotations are governed by a single kinematic relation so that two rotations must be established independently in order that the third be determined; and, among the three torques there exist two independent torque relationships, which implies that only one torque value may be established independently, Thus, in the proposed method each of prime movers 66, 68, 70, 72, 74 and 76 controls the six torques, while its speed is established by the respective roll speed and by the main gearing 50 and 14. The speed of the drive bridle gearing 14 is established by the main prime mover 10 speed. The speed of the drag bridle gearing 50 is controlled to an adjustable speed difference from the drive bridle gearing 14 by means of a main differential 92 and speed control device 94.

The invention may be understood by first considering only some elements shown in the figures. These are the prime mover 10, the bridle rolls 42 and 44, differential 30, prime mover 72, and the associated gears, shafts and couplings. The prime mover 10 is regulated to run at a desired speed. By means of shaft 12 and gears 20a, 20b and 20c contained in gear case generally 14, the prime mover 10 speed sets the speeds of shafts 22 and 24. The shaft 24 is coupled directly to roll 44 and by means of substantial engagement with the strip 1 controls strip speed.

The strip 1 speed having been established controls the speed of roll 42 by means of substantial frictional engagement and thus the speed of shaft 36 connected to roll 42 is established. Shafts 22 and 36 are two inputs to the differential 30 which is represented for illustrative purposes as a compound epicyclic differential which an integral double reduction gear set. The third input to differential 30 is a prime mover 72. Since the speeds of shafts 22 and 36 are established, the speed of prime mover 72 is established.

To transmit power from the main prime mover 10 to the roll 42, torque must be exerted by prime mover 72. If this toruqe is zero, torques on shafts 22 and 36 are also zero and no power is transmitted. Whatever torque is established by prime mover 72, the torques in shafts 22 and 36 are in direction proportion to this value, and thus the torque on shaft 36 is controlled by the torque established at prime mover 72.

It is evident that other rolls 46 and 48 together with their respective differentials 32 and 34 and their respective prime movers 74 and 76 may be incorporated into the system by the addition of suitable gears 20d and 20e and shafts 26, 28, 38 and 40. The figure shows blank boxes for differentials 60, 62, 64, 32 and 34 which are all similar to differential 30 shown in detail. Also, gear box 50 has similar gearing as gear box 14. Independent torque control for each additional roll is obtained by torque control of the prime movers 74 and 76 in a completely similar manner. The number of rolls is theoretically unlimited except that there must be at least two rolls one of which is direct coupled to the main prime mover 10.

The torque capacity of the prime mover 72 is established at some nominal fraction of the respective roll horsepower. Consider roll 42. Since power is supplied to roll 42 (power is always supplied to a drive bridle roll,) the power input to the differential 30 through shaft 36 will be a negative quantity, say $-P$. Then the power to be supplied by the prime mover means 72 is arbitrarily set at 0.05 P, which means that of the total power supplied to roll 42, five per cent is supplied by prime mover 72, the remaining 95 per cent being supplied by the main prime mover 10 through shaft 12, gears 20c, 20b and 20a, and shaft 22.

It is necessary to use the basic speed and torque relationships for the differential 72, which for illustration is selected as a compound epicyclic differential. The speed relationship is $$n_1 - r\,n_2 = (1-r)\,n_3 \qquad 1.$$

in which
$n_1$ = first input speed
$n_2$ = second input speed
$n_3$ = carrier speed (third input)
$r$ = internal ratio (a characteristic number for a given differential unit)

The torque relationships are $$Q_1 = -(Q_3)/(1-r) \qquad 2.$$
$$Q_2 = (r\,Q_3)/(1-r) \qquad 3.$$
$$Q_1 = -(Q_2/r) \qquad 4.$$

These first equations show that for any one speed to be determinate the other two speeds must be established. Equations (2), (3) and (4) show that only one torque may be independent, that is, if one torque is determined, the remaining two torques are automatically established.

Let the subscript 1 refer to the roll shaft input (shaft 36 in FIG. 1), the subscript 2, to the shaft connected to the main prime mover 10 (shaft 22), and the subscript 3, to the carrier 31.

The desired roll shaft torque $Q_1$ and roll shaft speed $n_1$ are established by general bridle drive design considerations, that is, by required tension values, coefficients of friction and angles of wrap. Thus the power input to the differential 30 at shaft 36 is $$P_1 = Q_1 N_1 \qquad 5.$$

Setting the power of the prime mover 72 at some arbitrary $p$ of the roll power gives $$P_3 = Q_3 n_3 = -p\,Q_1\,n_1 \qquad 6.$$

leaving the power input required at shaft 22

$$P_2 = Q_2\,n_2 = -(1-P)\,Q_1 n_1 \qquad 7.$$

The total power input, neglecting losses, to the differential 30 is $$P_1 + P_2 + P_3 = Q_1 n_1 - PQ_1 n_1 - (1-P)\,Q_1\,n_1 \qquad 8.$$

which is zero as required by the principle of energy conservation.

From $Q_1$, the torque on shaft 36, the torques $Q_2$ and $Q_3$ are calculated by use of Equations (2) and (4), that is, $$Q_2 = -r\,Q_1 \qquad 9.$$
$$Q_3 = -(1-r)\,Q_1 \qquad 10.$$

From Equations (6) and (7) it follows that $$n_3 = -(P\,Q_1\,n_1)/(Q_3) \qquad 11.$$

and $$n_2 = -[(1-P)Q_1 n_1]/[Q_2] \qquad 12.$$

Use of Equations (9) and (10) in Equations (11) and (12) gives $$n_3 = [P\,n_1]/[(1-r)] \qquad 13.$$

and $$n_2 = (1-P)n_1/r \qquad 14.$$

Since $r$ is always a positive number, it follows from Equation (14) that the velocity $n_2$ has the same direction as velocity $n_1$. Equation (1) shows that the torques $Q_1$ and $Q_2$ must be in opposite directions. It follows that the products $Q_1\,n_1$ and $Q_2\,n_2$ are opposite in sign, which is required for power flow from shaft 22 to shaft 36.

The direction of rotation of carrier 31 depends upon whether the number $r$ is greater than or less than 1. If it is greater than 1, $n_3$ is in the opposite sense to $n_1$, and the corresponding torque $Q_3$ is in the same sense to $Q_1$. Thus the products $Q_1\,n_1$ and $Q_3\,n_3$ are in the opposite sense as they should be for energy to be supplied to the differential by the prime mover 72 and to be carried away by shaft 36 to the bridle roll 42.

Equation (14) establishes the required velocity $n_2$ of shaft 22. The ratio of this velocity to the velocity of the prime mover 10 will establish the gearing required between shaft 22 and the prime mover 10, which will be different from the gear ratio between shaft 24 and the prime mover 10. Thus gear 20a will have a different number of teeth from gear 20b. Similarly, gears 20d and 20e will be different from gear 20b. It is desirable that gears 20a, 20d and 20e be the same, but this is not possible because the total gear system between shaft 22 and the prime mover 10 contains a different size gear 20b from those in the gear systems between shafts 26 and 28, and the prime mover 10.

A specific numerical example will further clarify the system. Let
$r = 1.15$
$Q_1 = -100,000$ lb. in.
$n_1 = 100$ r.p.m.
$P = 0.05$ Then from Equations (5), (6) and (7)

$P_1 = (-100,000)(100) = -10,000,000$ lb.in. rpm.
$P_3 = -(0.05)(-10,000,000) = 500,000$ lb.in. rpm.
$P_2 = -(0.95)(-10,000,000) = 9,500,000$ lb.in. rpm.

From Equations (9) and (10)
$Q_2 = -(1.15)(-100,000) = 115,000$ lb.in.
$Q_3 = -(-0.15)(-100,000) = -15,000$ lb.in.
From Equations (13) and (14)
$n_3 = [(0.05)(100)]/[(-0.15)] = -33.3$ rpm
$n_2 = [(0.95)(100)]/1.15 = 82.6$ rpm
Substitution of these speed values into Equation (1) gives
$100 - (1.15)(82.6) = (-0.15)(-33.3)$
$5 = 5$ (check)

The power to be supplied by the second prime mover 72 is
$P_3 = Q_3 n_3 = (-15,000)(-33.3)$
$= 500,000$ lb. in rpm
$= 7.95$ horsepower Since 33.3 rpm is too slow an operating speed for a D.C. motor prime mover means, a double reduction gear set, as shown in FIG. 1, is used to increase the speed to a more appropriate value.

In operation the speeds $n_1$ of shaft 36 and $n_2$ of shaft 22 are controlled so that the speed of $n_3$ of carrier 31, and thereby the prime mover 72 are determined. Then the prime mover torque is controlled to set the torque $Q_3$ on carrier 31 at the required value. Thus the roll horsepower of 10,000,000 in.lb.rpm or 157 horsepower is completely controlled with a motor of less than 10 horsepower capacity, which effects a great cost saving.

The selection of the second differentials 32 and 34, connecting shafts 26 to 38 and 28 to 40 respectively, and the prime movers 74 and 76, to control torques on rolls 46 and 48 is accomplished in the same manner as shown above.

The design of the drive system for the drag bridle is accomplished in a similar manner. The main prime mover 10, through shaft 12 and bevel gear 16, drives bevel gear 18 and shaft 96 which is one input to the coupling differential 92. Speed control 94 through gears shown in coupling differential and gear box 92 rotates the carrier 93 of the coupling differential so that shaft 98 rotates at a controllably different speed than shaft 96. Shaft 98 drives a system of gears contained in gear box 50, this system of gears being similar to those in gear box 14, the main difference being that there is no connection to a prime mover as in gear box 14.

The drag bridle roll 88 is direct-coupled to the gearing in gear box 50 by means of shaft 56 so that its speed bears a fixed relation to speed of shaft 98. The remaining rolls 84, 86 and 90 of the drag bridle are coupled by shafts 78, 80 and 82, respectively, to differentials 60, 62 and 64 respectively. These differentials are coupled by means of shafts 52, 54 and 58 respectively, to the gearing in gear box 50. These differential means 60, 62 and 64 are each driven by prime movers 66, 68 and 70 respectively. The operation of this drag bridle drive system is similar to that of the drive bridle and the selection of the differentials 60, 62 and 64 and prime movers 66, 68 and 70 is made in a manner similar to the above.

The fraction P of the nominal roll power P may be either positive or negative. This permits the use of a negative prime mover, a generator or a brake, when circumstances make such a choice advisable. It will be realized that the use of generator or brakes as second prime mover means removes energy from the system, which will be reflected in a main prime mover means of somewhat greater capacity.

Variations of the system shown in FIG. 1 are possible. For example, one may elect to remove differential 92 and speed control 94 so that shaft 96 is direct-coupled to shaft 98. Then by connecting roll 88 through a new differential means to the gearing in gear box 50, and by driving this differential by a new speed control device, one will achieve speed control of roll 88. But this is a minor variation of the basic ideas disclosed herein, which still fall within the scope of this invention.

Another variation of the system shown in FIG. 1 is to connect the main prime mover 10 through the shaft 12 to the gearing in gear box 50, instead of to the gearing in gear box 14, but there is a disadvantage here in that all the power from both the drag bridle as well as the main prime mover must pass through the main differential 92.

While I have shown a present preferred embodiment of my invention in the foregoing specification, it will be understood that this invention may be otherwise embodied within the scope of the following claims.

I claim:

1. A torque distribution system for a strip bridle system having a plurality of rolls with shafts which comprises:
   a. a main prime mover means coupled to a first roll shaft with a first roll;
   b. a differential means having three inputs, a first input coupled only to one second roll shaft with a second roll which rotates at essentially the same peripheral speed as the first roll, a second input coupled to the main prime mover; and
   c. a second prime mover means of less horsepower than the main prime mover means coupled to the third input of the differential means.

2. A torque distribution system as recited in claim 1 including:
   a. a coupling differential means having three inputs, a first input coupled to the main prime mover, a second input coupled to a third roll shaft with a third roll which rotates at a different peripheral speed than the first and second rolls; and
   b. a speed control means coupled to the third input to the coupling differential.

3. A torque distribution system for a strip bridle drive system having a plurality of rolls with shafts which comprises:
   a. a main prime mover means coupled to a first roll shaft with a first roll;
   b. a plurality of differential means each having three inputs, a first input of each differential means coupled only to one corresponding roll shaft with a roll in a group of rolls which rotate at essentially the same peripheral speed as the first roll, a second input from each differential means coupled to the main prime mover; and
   c. a plurality of secondary prime mover means of less horsepower than the main prime mover means, each secondary prime mover coupled to a corresponding differential means at the third input of each differential means.

4. A torque distribution system as recited in claim 3 including:

a. a coupling differential means having three inputs, a first input coupled to the main prime mover, a second input of the coupling differential means coupled to a second roll shaft with a second roll which rotates at a different peripheral speed than the other rolls; and b. a speed control means coupled to the third input to the coupling differential means.

5. A torque distribution system for a strip bridle system having a plurality of rolls with shafts which comprises:

a. a main prime mover means coupled to a first roll shaft with a first roll;

b. a plurality of first differential means each having three inputs, a first input of each first differential means coupled only to one corresponding roll shaft in a first group of roll shafts with rolls which rotate at essentially the same peripheral speed as the first roll, a second input of each first differential means coupled to the main prime mover;

c. a plurality of second prime mover means each of less horsepower than the main prime mover means and each coupled to a corresponding first differential means at the third input of the first differential means;

d. a coupling differential means having three inputs, a first input coupled to the main prime mover;

e. a second roll which rotates at a different peripheral speed from the first roll coupled to the second input of the coupling differential;

f. a plurality of second differential means each having three inputs, a first input of each second differential means coupled only to one corresponding roll shaft with a roll in a second group of roll shafts with rolls which rotate at essentially the same peripheral speed as the second roll, the second input of each second differential means coupled to the second input of the coupling differential means;

g. a speed control means coupled to the third input to the coupling differential means; and h. a plurality of third prime mover means each of less horsepower than the main prime mover means and coupled to a corresponding second differential means at the third input of the second differential means.

* * * * *